Oct. 27, 1942.　　　L. CALDWELL　　　2,300,042
CALCINING APPARATUS
Filed July 29, 1940　　　3 Sheets-Sheet 1
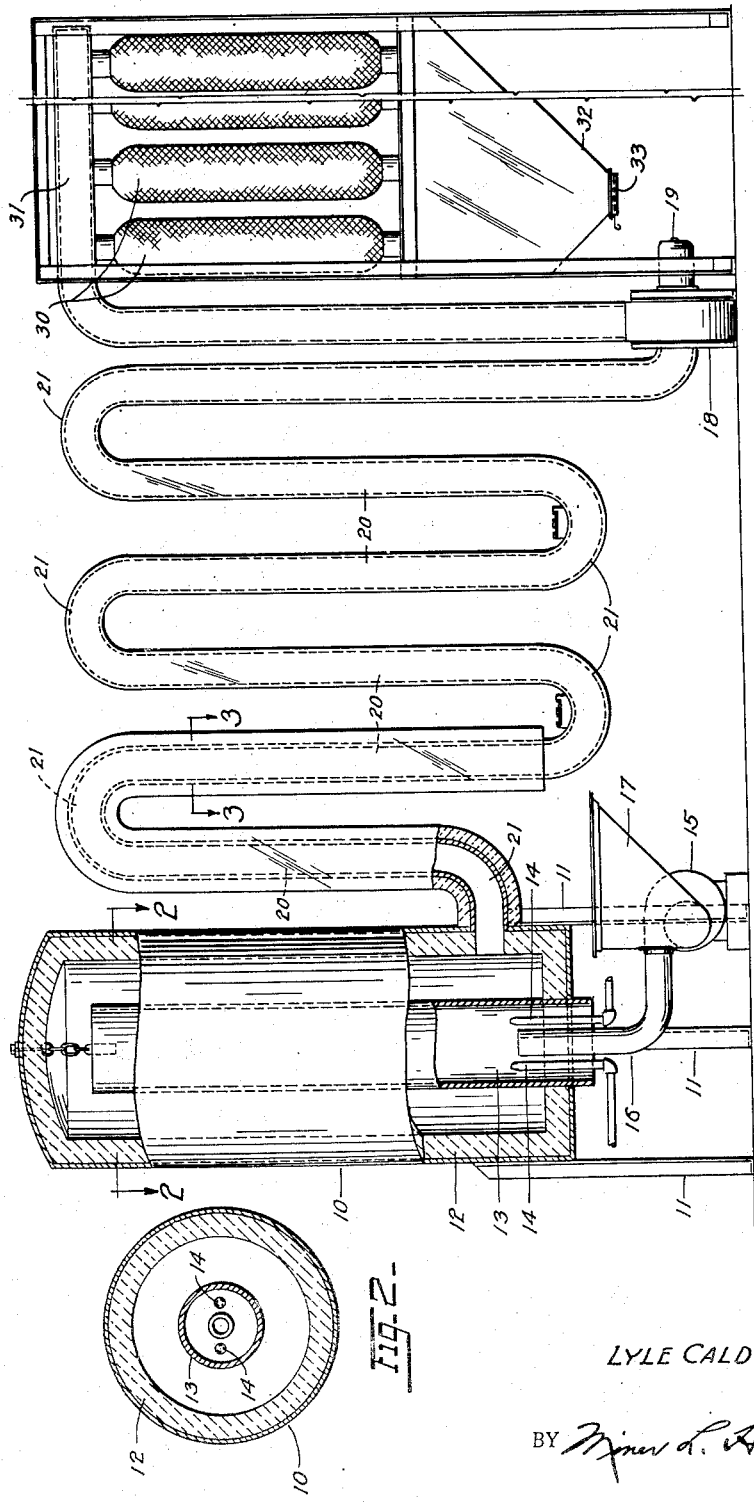
LYLE CALDWELL
INVENTOR.
BY *Miner L. Hartmann*
ATTORNEY

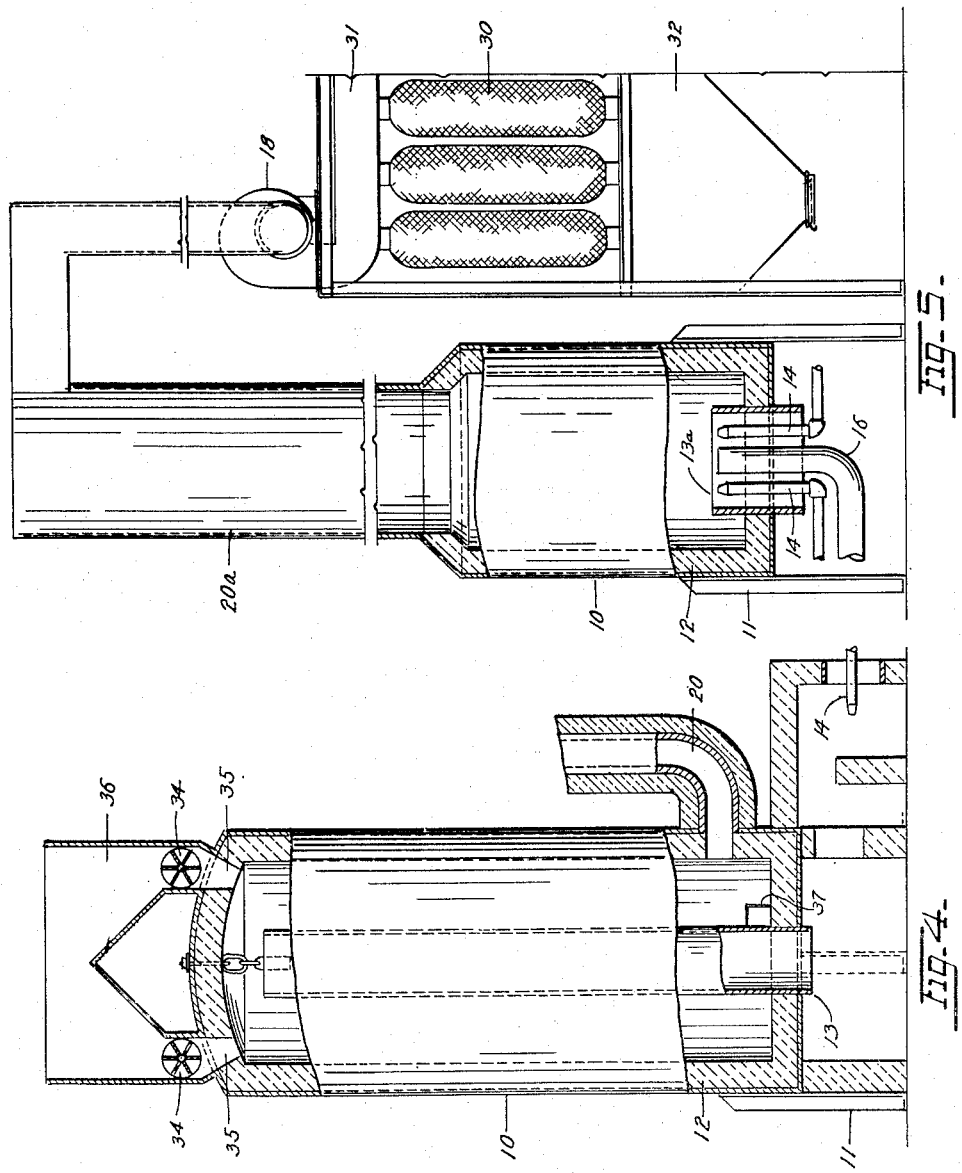

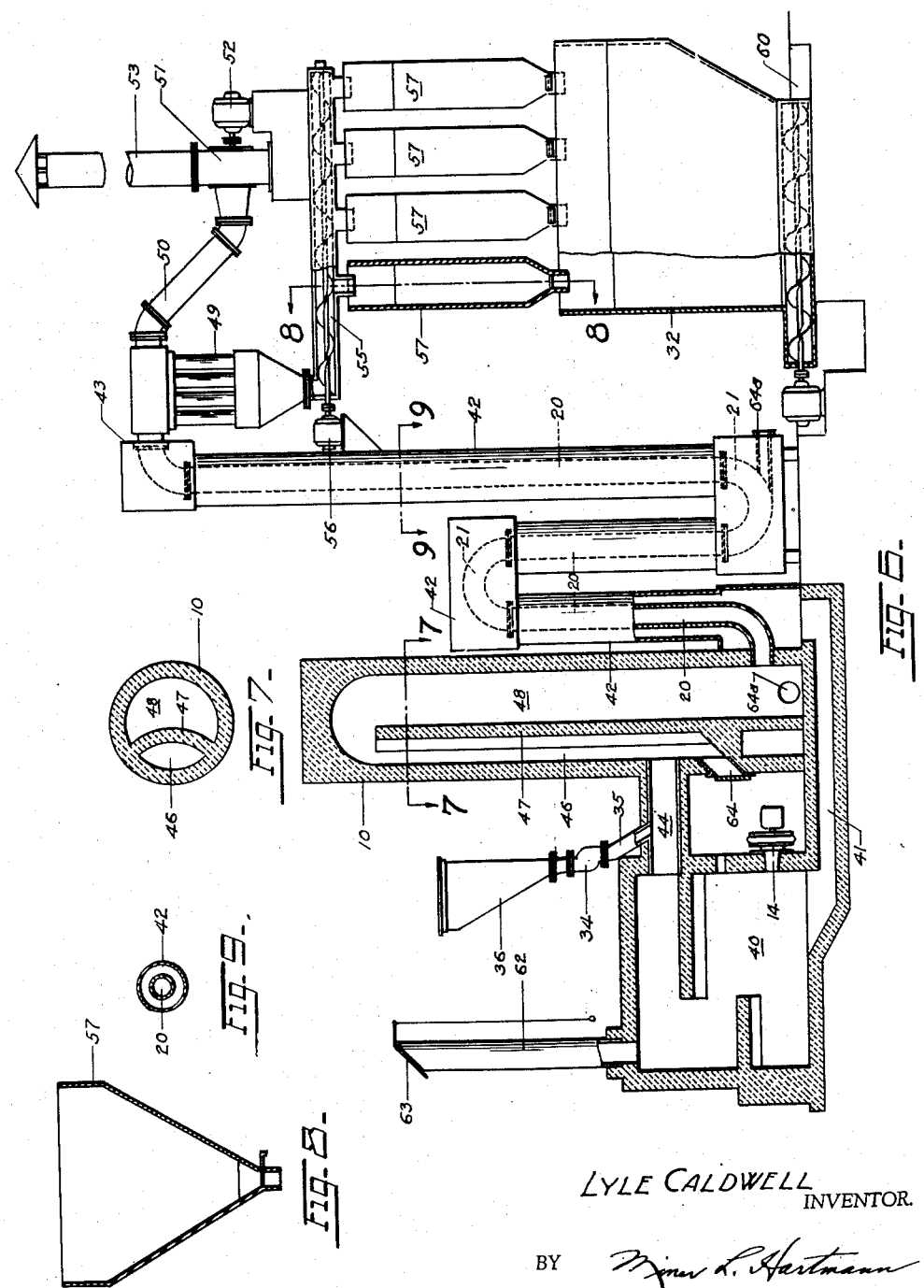

Patented Oct. 27, 1942

2,300,042

UNITED STATES PATENT OFFICE 2,300,042

CALCINING APPARATUS

Lyle Caldwell, Los Angeles, Calif., assignor to Brucite Processes, Inc., San Francisco, Calif., a corporation of California Application July 29, 1940, Serial No. 348,109

8 Claims. (Cl. 263—21)

This invention relates to calcination of powdered materials and in particular to a method for calcining magnesia minerals and to apparatus for carrying out the method.

In the heating or calcination of magnesia minerals such as magnesite and brucite, the high heat insulating property of the resulting product, magnesium oxide, causes difficulty when the usual methods of calcination are attempted. The fluffy magnesium oxide which first forms on a lump or granule, insulates the uncalcined portion, and unless precautions are taken to overcome this effect, when milled the product is not uniform, as the centers of the pieces may contain uncalcined or partially calcined mineral. Further, because freshly made magnesium oxide has a marked tendency to absorb moisture, its collection as a fine powder after calcination by the usual methods results in some rehydration. By my invention, I overcome these difficulties, and provide a method which insures complete calcination of brucite, magnesite and the like in powder form, and I have also provided several forms of apparatus in which this method may be effectively carried out.

These and other objects of my invention are attained by the described method, and the description and accompanying drawings in which:

Fig. 1 is a side elevation, partly in section, showing a calciner of my invention;

Fig. 2 is a cross-sectional view of the combustion chamber taken on the line 2—2 of Fig. 1;

Fig. 3 is a cross-sectional view of the calcining flue taken on the line 3—3 of Fig. 1;

Fig. 4 shows a side elevation, partly in section, of another form of the combustion portion of a form of my invention;

Fig. 5 shows in elevation and section still another form of my invention;

Fig. 6 is a side elevation, partly in section, showing another form of calciner and collecting arrangement;

Fig. 7 is a cross-sectional view taken on the line 7—7 of Fig. 6;

Fig. 8 is a cross-sectional view taken on the line 8—8 of Fig. 6;

Fig. 9 is a cross-sectional view taken on the line 9—9 of Fig. 6.

Referring particularly to Figs. 1, 2 and 3, a cylindrical combustion chamber 10, supported above ground level on supports 11, is provided with a refractory insulating lining 12, and a center tube 13, which is open at the top within the combustion chamber. This tube 13 is preferably made of heat resisting metal, so that heat will be conducted through it as well as be conveyed in the moving combustion gases. Fuel burners 14 project into the lower end of the center tube, air being admitted around them. A small blower 15 also discharges into the lower end of the center tube 13 through the feed pipe 16. The fan 15 picks up previously pulverized mineral such as magnesite or brucite and the like from a feed hopper 17 at the intake of the blower; and the blower forces it into the center tube 13. The burning gases and suspended powder travel up the center pipe, combustion being completed near the top and on the down-path outside the tube. The blower 18, driven by the motor 19 pulls the combustion gases and excess air at high velocity through the vertical pipes 20, which are connected at tops and bottoms by smooth rounded U bends 21 to form a long but smooth path through which the powder being calcined travels at high speed. The discharge from the blower 18 carries the air and combustion gases, now relatively cool, into dust collecting bags 30 attached to the header 31, the collected material being finally discharged from the bags into bin 32 from which it may be packed, a discharge door 33 being provided in the bottom of the bin.

The dust collecting bags are preferably made of glass fiber to withstand temperatures above the condensation point of water vapor, so that when large quantities of water are evaporated during calcination, for example as in the case of brucite, the temperature of the gas delivered to the bags may be kept high enough to avoid wetting the fabric and thereby preventing the separation of the gas from the powder. A high temperature of collection of the powder is also required to avoid the rehydration of the freshly calcined magnesia powder when exposed to ordinary partly humid air.

The pipes 20 are preferably made of metal such as stainless steel with a high polish on the inside surfaces, which permits operation at high temperatures without oxidation of the pipe, and providing a smooth frictionless surface to the long pipe which prevents material from sticking and building up inside the pipe.

Whenever sticking does occur, other materials tend to collect upon the first, causing obstruction and local overheating of material and pipe. A sufficiently high velocity of gas is maintained to prevent settling and the forming of obstructions, and yet give sufficient time for completion of the calcining reaction, whether it be brucite to form water and magnesium oxide, or magnesite to form magnesium oxide and carbon-dioxide, or mixtures of them. The portion of the pipe adjacent the combustion chamber may be insulated on the outside for a sufficient distance to lengthen the calcining zone if required to complete the reactions.

In Fig. 4 is shown an alternative method of introducing the powdered magnesite or brucite into the combustion zone of the furnace. In this arrangement, the fuel is partly burned in a pre-combustion chamber, and the hot gases carried up the center tube 13, air for combustion being drawn in around and through the burners by the main suction blower 19, as in Fig. 1. The powdered mineral is fed into openings 35 at the top of the furnace by rotary feeders 34 in the lower part of the feed bin 36. The powder falls around the center tube and through the high temperature gases and then through the pipes 20 to the baghouse collector as before described under the arrangement shown in Fig. 1. A clean-out door 37 is provided in the combustion chamber, from which coarser pieces of partly calcined material may be withdrawn and reprocessed after grinding. This arrangement allows the burners to be operated free from falling powdered mineral, and in the use of oil burners it allows much better operating conditions.

In Fig. 5 is shown another form of my calciner which operates on the same principle, but has the long reaction chamber in a vertical position instead of in the more convenient shorter vertical pipes with connecting bends. In this form, the powdered mineral is blown into the combustion furnace 10 through the short tube 13a, into which also project the fuel burners 14, as in the arrangement shown in Fig. 1. Combustion takes place mainly in the lower part of the chamber 10, the mineral powder in various stages of calcination being carried upward by the rapidly moving gas in the upright pipe 20a, drawn from the top by the blower 18 as before, into dust-collecting bags 30 and hopper 32. This arrangement permits the use of a straight pipe 20a without the return bends 21 of Fig. 1, and avoids all possibility of depositing material in the bends of the pipes. The height of the tube 20a may be chosen to give the proper reaction time and temperature.

In Figs. 6, 7, 8 and 9 is shown another arrangement of calciner and powder collector, in which the entire system is operated under reduced pressure. In the pre-combustion chamber 40 the fuel, from a burner 14, is mixed and burned with pre-heated air brought through conduit 41, which is connected with the air-cooling duct 42 around the vertical reaction pipes 20 and bends 21, the cool atmospheric air being admitted preferably at 43. The hot combustion gases pass through the flue 44 into which powdered magnesium mineral is introduced from the feeder 34 and hopper 36, by way of feed tube 35. The mixture of hot gas and powdered mineral passes up through the upward flue 46 of the calciner chamber 10, a wall 47, dividing this chamber into the smaller up-flue 46 and the larger down-flue 48. The velocity of the gases is decreased due to the larger area in the down flue, and the time of passage permits substantial complete calcination of the mineral powder. The mixture of gas and calcined powder passes through the smooth tubes 20, where the calcining reaction may be completed if not complete in the calciner proper, and where the gas and powder are cooled down sufficiently for separation, by the surrounding pipes or conduits 42 above described. The mixture of powder and gases, thus cooled without admixture of atmospheric air, is separated into powder and gas at temperatures well above the dew point, in any suitable separator such as the multiple "cyclone" collector 49. The partly cooled powdered magnesia which is thus collected is distributed by the closed conveyor 55 driven by motor 56 to a series of narrow cooling bins 57. When the powder is sufficiently cool it is discharged into the closed packing bin 32 from which it may be discharged through the conveyor spout 60 and packed. The air and gases, including water vapor and carbon dioxide from the calcination are discharged from the "cyclone" collector 49 through the pipe 50 to the intake of a blower 51 actuated by the motor 52, and discharged into the air through pipe 53. The entire system is thus operated under pressure below atmospheric. In order to permit starting the combustion in the furnace, a stack 62 with flap cover 63 is provided. A clean-out means 64 is provided in the calciner and elsewhere in the system where required.

The method of calcining has been indicated in the above description of several forms of apparatus in which it may be carried on. Granulated or fine powdered mineral is fed into the high temperature zone of a calcining chamber where it is heated and the calcining reaction carried to completion while the particles are suspended in the rapidly moving combustion gases, until they have cooled below the reaction temperatures, following which the calcined mineral powder is separated from the gases by suitable means which may be by glass fabric bag filters, or by "cyclone" separators, in either case the temperature being held above the dew point.

In calcining magnesite, particularly crystalline mineral, temperatures as high as 1500° F. are used in the calcining chambers, although in dehydrating brucite alone, lower temperatures may be used. The temperatures in the pipes gradually decrease from the combustion furnace end to the collector, where about 400° F. is maintained. The temperatures may be lowered at any point by admitting cold air from the atmosphere through doors such as shown in the lower bends of the pipes in Fig. 1, or by admitting fresh air to the cooling duct 42 at other points than the opening 43 shown in Fig. 6.

While I have used my invention mainly in connection with the heat treatment of magnesite and brucite, and believe it is particularly advantageous for these materials, it is obviously not so limited, but may be used to calcine or heat treat other powdered materials. One particular advantage of my method is that it avoids the after grinding of the calcined product, since it has already been sufficiently pulverized before calcining, and in the case of hygroscopic powders it is especially advantageous to have pulverized before calcination.

By calcining magnesite by this process, I produce a product whose apparent weight per cubic foot is only about fifty pounds whereas the material produced by lump calcination and subsequent grinding usually weighs more per unit volume. By calcining the materials in powder form in suspension in gases, I avoid the necessity for excessively high furnace temperatures required to overcome the heat insulating property of the calcined outer coating which first forms. By collecting the powder above the dew point, I avoid the partial rehydration of the powder, which very quickly takes place to the extent of 3 to 5 percent of water, upon exposure of the freshly calcined powder to ordinary air such as would occur by the ordinary methods of collection, or of grinding and collection after calcination in lumps. My product is more uniform both physically and chemically, and is preferred where further chemical interactions are intended.

While I have described preferred forms of furnace and collecting systems, and a preferred method for calcining magnesium materials, I do not wish to limit myself to the particular furnaces shown, but restrict my invention only insofar as required by the state of the art and the spirit of the appended claims.

I claim:

1. A mineral powder calciner comprising a vertically disposed chamber having a relatively small cross-sectional area up-flue which opens into a relatively larger cross-sectional area down-flue near their tops, a conduit near the bottom of said up-flue for introducing high temperature gases for calcining, means for distributing finely powdered mineral into said gases, an elongated cooling conduit of cross-sectional area less than that of said down-flue connected near the bottom of said down-flue and disposed substantially wholly in vertical position, said elongated conduit being adapted to carry suspended powder therethrough without substantial lodgement or settling out, and means for drawing the gases and suspended powder through said calciner.

2. A mineral powder calciner comprising a combustion furnace, fan means for feeding powdered material with air at the tuyères of said combustion furnace, a thin metal vertical stack of smaller cross-sectional area than said furnace for carrying the mixture out of said furnace and of sufficient length to cool the calcined powder in suspension without settlement, a suction blower connected to the high end of the stack, and means connected with the discharge of said blower for separating the gases from the calcined powder.

3. A mineral powder calciner and collector system comprising a combustion chamber, a calciner having a high-speed up-flue of relatively small cross-sectional area and a lower speed down-flue of larger cross-sectional area, means for feeding mineral powder into the combustion gas at the entrance to said up-flue, an elongated thin stainless steel conduit having an aircooling duct therearound for cooling the mixture of combustion gases and calcined powder, means for separating the powder from the gases at temperatures above the dew point, and fan means for drawing air through said air-cooling duct to preheat the air for combustion in the combustion chamber as well as to convey the gases and powder through said calciner and elongated conduit.

4. The apparatus claimed in claim 1, in which the elongated conduit is constructed of highly polished thin stainless steel sheets.

5. The apparatus claimed in claim 2, in which the elongated conduit is constructed of highly polished thin stainless steel sheets.

6. A mineral powder calciner and collector system comprising a vertically disposed combustion furnace, feeder means for introducing powdered mineral into the combustion gases of said furnace, an elongated cooling conduit of cross-sectional area less than that of said combustion furnace and for the greater part disposed vertically adapted to convey the gases and substantially all of the calcined powder out of the combustion furnace and to cool the same by radiation without settlement or lodgement of the powder, said conduit being constructed of highly polished thin stainless steel sheets, a powder collecting device, and fan means for conveying the gases and powder through said system.

7. In a mineral powder calciner having a vertically disposed combustion furnace and means for feeding powdered material into the combustion gases of said furnace, an elongated cooling conduit of cross-sectional area less than that of said combustion furnace and for the greater part disposed vertically adapted to convey the gases and substantially all of the calcined powder out of the calcining zone of said combustion furnace and to cool the same by radiation without settlement or lodgement of the powder, said conduit being constructed of highly polished, thin, stainless steel.

8. A mineral powder calciner and collector system comprising a vertically disposed combustion furnace, feeder means for introducing powdered mineral into the combustion gases of said furnace, an elongated highly polished thin stainless steel cooling tube free from internal irregularities and dust collecting obstructions of cross-sectional area less than that of said combustion furnace adapted to convey the calcined powder from said combustion furnace to a powder collecting device, a powder collecting device, and fan means for conveying the gases and powder through said system.

LYLE CALDWELL.